July 16, 1963    S. W. BOWEN ET AL    3,097,517
CHROMATOGRAPHY
Filed May 23, 1957    3 Sheets-Sheet 1

INVENTORS.
STUART W. BOWEN
MONTE L. MARKS
BY
Christie, Parker & Hale
ATTORNEYS

United States Patent Office 3,097,517
Patented July 16, 1963

3,097,517
CHROMATOGRAPHY
Stuart W. Bowen and Monte L. Marks, Pasadena, Calif., assignors, by mesne assignments, to Consolidated Electrodynamics Corporation, Pasadena, Calif., a corporation of California
Filed May 23, 1957, Ser. No. 661,081
6 Claims. (Cl. 73—23)

This invention relates to chromatography and particularly to a method and apparatus for effecting variable peak separation in gas chromatography.

Gas chromatography is a term which may properly be applied either to adsorption or gas-liquid partition chromatography. In adsorption chromatography a column containing appropriate adsorbent, usually in granular form is used to separate the various constituents of the gas sample. The sample is generally introduced to the column This order is a function of the relative volatility, molecular Under proper conditions various components of the gas sample are spatially separated by the process of selective adsorption and desorption, closely analogous to the mechanism of fractional distillation, so that the constituents are stratified in the column and continued flow of elutant gas causes ejection from the column in sequential order. This order is a function of the relative volatility, molecular weight, or other property affecting the degree of adsorption of the gas constituents on the adsorbent in the column.

Conventionally, as the separated gases emerge, they are passed through a suitable detector element which may be a thermal conductivity cell, gas balance, or the like, which senses a characteristic property of the gas such as thermal conductivity, density or mass to indicate and identify the amount of the several components thereof.

The essential feature of gas-liquid partition chromatography is the provision in the chromatographic column of an extensive liquid surface over which the gas is caused to flow. Normally this is accomplished by disposing the desired liquid in static condition as a very thin film over the large exposed surface of an inert support. When a gas sample is passed through a column of this type in company with a suitable elutant or carrier gas, the continuous solution and evaporation which takes place along the column makes it again, in effect, a distillation operation in which the lighter components of the gas sample are carried more rapidly to the outlet of the column than the heavier ones. It is also conventional in gas-liquid partition chromatography to pass the gaseous effluent from the column through a suitable detector to sense the identity and quantity of the separated constituents.

The packings most commonly used in chromatographic columns at the present time are activated carbon, alumina, silica gel, and, in the case of gas-liquid partition chromatography, a high boiling liquid disposed on a relatively inert carrier such as diatomaceous earth, ceramic beads or ceramic disks. The various liquids presently in use for this purpose include mineral oil, di-octyl phthalate, dinonyl phthalate, silicone fluids, tricresyl phosphate, dibutyl phthalate, and the like. Either normally liquid or normally gaseous materials may be sampled and analyzed in either of the described forms of chromatography. In the event a liquid sample is involved it is vaporized in the carrier stream and proceeds through the chromatographic column in this state.

In passing a gas sample through a chromatographic column under constant conditions of temperature and elutant flow rate the appearance time of the components in the elutant discharged from the column is a function of the molecular weight of the components the function being such that increasing molecular weight greatly delays this appearance time. It has been shown that increasing the temperature of a chromatographic column during the time a sample is in the column can result in better and more rapid separations and more usable records than when a constant temperature is maintained. An exhaustive discussion of the effect of temperature in chromatographic separation is given in the following publications: Drew et al., reprints of papers to be read at a symposium on Vapor Phase Chromatography, May 30 and June 1, 1956, edited by D. H. Desty; London, Butterworth's Scientific Publications, 1956, page H137; and S. A. G. Greene et al., "Separation of Gases by Gas Chromatography," Analytical Chemistry 28, No. 9, page 1369.

Even though the desirable consequence of temperature increase in a chromatographic column has been previously determined, there has been no satisfactory means suggested to date for accomplishing this objective. Programmed temperature devices heretofore available have required heated constant temperature baths and the like, all of which suffer from inherently long time constants of temperature change due to the large thermal masses of such forms of apparatus.

We have now found that the complexities and difficulties of such heaters, the long time constants and the lack of reproducibility are all overcome if the column is so constructed as to act as its own heater. This objective we have accomplished by forming the column from an electroconductive metal and connecting it to means for passing an electric current through the column thereby causing the electrical resistance of the column tubing to supply the heat. The temperature response speed is vastly increased even at moderate electrical power due to the low thermal inertia of the tubing. Since the power is uniformly developed along the column, no special precautions need be taken to insure uniform heating. Thermal conduction in the tube wall tends to reduce any inequalities of heat production that might occur due to local differences of electrical resistance.

The invention therefore contemplates in a chromatographic system the combination comprising an electroconductive tubular chromatographic column and means for passing an electric current through the tube to heat the tube walls.

It is preferable in utilizing the invention to embody at least the chromatographic column of such a system in an insulated housing. In practice not only the column but also any electrochemical or electrophysical gas detector is advantageously disposed within the same insulated housing.

It is exceedingly simple to provide the column with a variable source of power supply so that different temperatures and different transient times may be selected at will depending upon the particular analysis. For purposes of process monitoring where discrete samples are passed through the column in successive intervals, the temperature pattern may be programmed by the simple expedient of embodying a clock timer for controlling both the sample inlet system and the electrical power supply for heating the column. If a high duty cycle is desirable it is recommended that means be provided for artificially cooling the column so as to reduce unused time between cycles. Means for accomplishing this end are included in the following description.

The apparatus will be more clearly understood by reference to the following detailed description taken in conjunction with the accompanying drawings in which.

Figure 1:
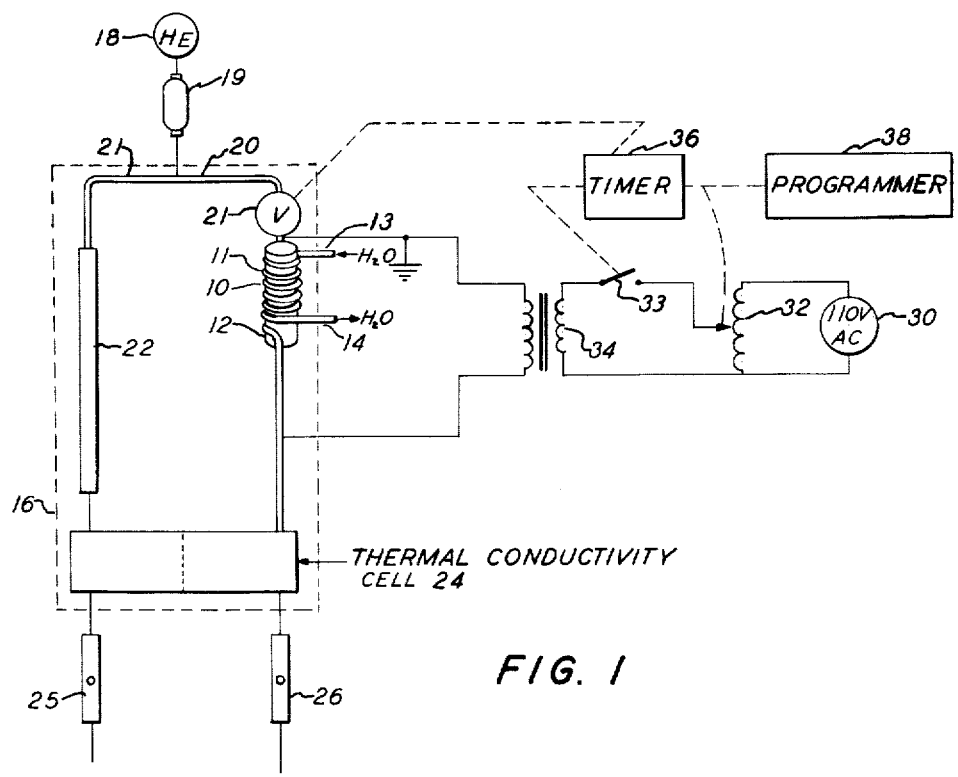
FIG. 1 is a flow diagram of a chromatographic system in accordance with the invention.

A chromatographic system illustrated in flow diagram in FIG. 1 consists of an electroconductive tubular column 10 which for purposes of reducing the bulk of the apparatus is shown as wound in a helix as is conventional practice. The column may be of a conductive metal such as copper, aluminum, stainless steel or others, or may be of non-metallic conductive materials. As one means of cooling the column 10 for the purposes above-mentioned a tube 11 preferably of a high dielectric reasonably thermally conductive material such as a plastic capable of tolerating the temperatures to which it is exposed in the system is wound in a bifilar fashion coaxially with the tube 10. Conveniently both tubular coils are wound about an insulating mandrel 12. The coil 11 has a water or other coolant nipple 13 and an outlet nipple 14.

The chromatographic column together with other portoins of the system to be described is housed within an insulating house 16. In a typical system this may be a metal housing with an inner liner of two inches of glass wool mat. A helium supply 18 or source of other eluant gas is connected generally through a dryer 19 into the gas flow system within the housing 16 at which point helium is channelled through a tube 20 and a sample inlet valve 21 into the column. Another portion of the helium flow is by-passed through a conduit 21 and a capillary tube 22 for establishing a pressure drop generally matching that occurring across the column. The column and the capillary tube in the embodiment shown discharge into the two sides of a conventional thermal conductivity cell 24, both streams being metered upon discharge from the cell 24 in flow meters 25 and 26.

A source 30 of A.C. voltage is connected across a variable tap potentiometer 32 which is connected through a switch 33 across the primary coil of a transformer 34. The transformer is a step down transformer which may be of about a 20 to 1 ratio and the secondary coil of which is connected across the column as illustrated.

For intermittent analysis no programming or time synchronization is required and the column can be heated at will simply by manipulation of switch 33. However, for process monitoring operations as above described a conventional clock timer 36 is connected to operate the sample valve 21 and also the switch 33. The operation of the two is not necessarily simultaneous.

In many types of samples it is desirable to develop the low molecular weight components at ambient temperature and in such circumstances the power is not switched into the column until after the sample is partially analyzed. Under such circumstances the timer may be set to supply current to the column after any predetermined interval of sample flow. To further refine the system a programmer 38 may be included and linked as indicated both to the timer and to the adjustable tap of potentiometer 32 under which circumstances the column temperature can be programmed almost as desired.

In process monitoring operations the column may be rapidly cooled between cycles by flowing a coolant such as water through the tube 11. Such flow also is susceptible to programming or timing by the timer 36 and programmer 38 or manually if desired. So that the coolant disposed in the cooling tube at the termination of the cooling step does not represent a heat sink, a provision may be made for draining the tube automatically or manually when the cooling is completed.

Figure 2:
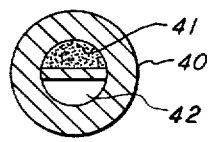
FIG. 2 is a cross section through a form of electroconductive tubing which may be used to replace the simple tubing illustrated in the apparatus of FIG. 1 for rapid cooling.

FIG. 2 is a cross section of a type of metal tube now available commercially which may be used in fabricating the column 10 so as to eliminate the need for a companion cooling tube. Tube 40 shown in FIG. 2 has two discrete bores 41 and 42. In use as a chromatographic column the bore 41, for example, may be charged with the column packing and the bore 42 employed for flow of coolant fluid.

Figure 3:
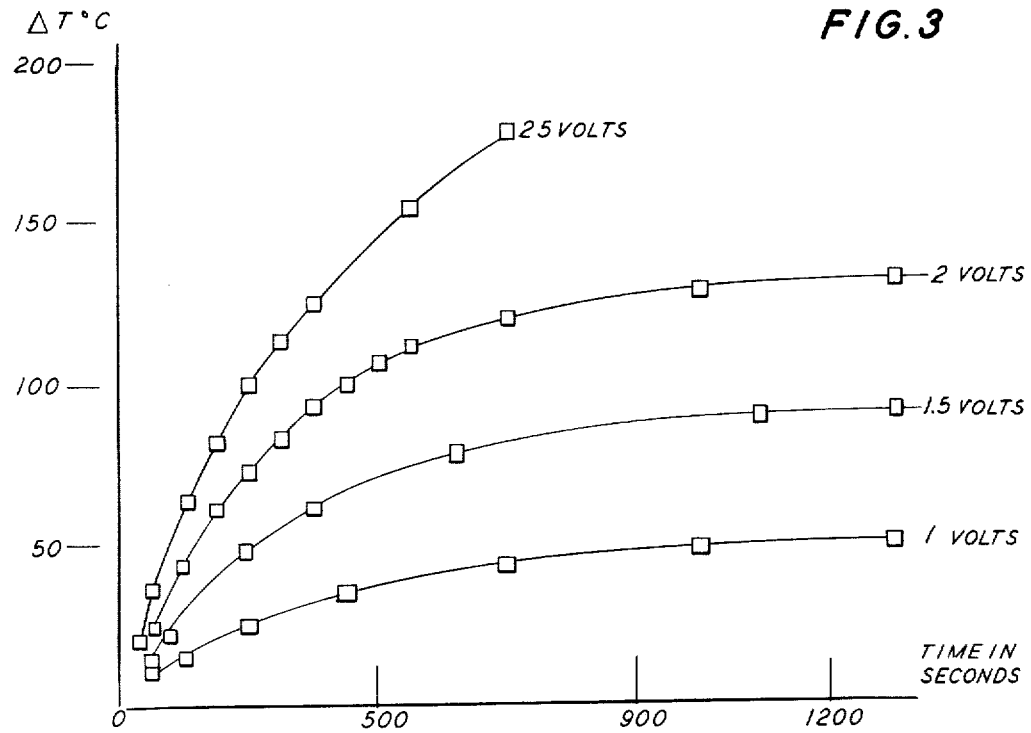
FIG. 3 is a chart showing temperature curves for a typical column at different power settings.

FIG. 3 is a graph showing the temperature rise in a No. 304 stainless steel tube ¼ inch O.D. and .020 inch well thickness housed in an insulated housing of the type described above at varoius power settings. The ordinate is subdivided in seconds and the abscissa in $\Delta T°$ C. Each of the four curves illustrated is clearly labeled in terms of voltage and illustrates quite clearly the temperature response of this type of tube at the different voltage settings.

Figure 4:
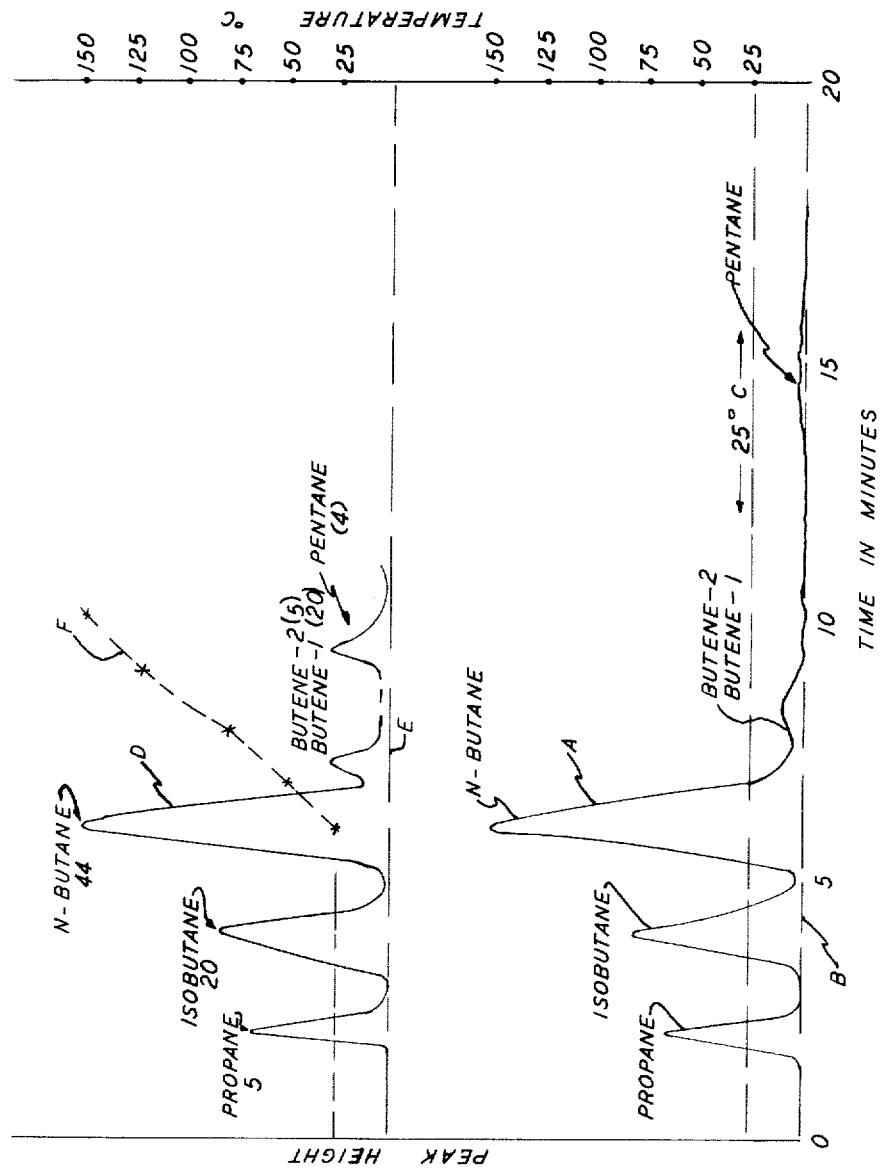
FIG. 4 is a reproduction of an actual analysis with and without temperature variation in apparatus of the type shown diagrammatically in FIG. 1.

FIG. 4 is a graph in two identical sections showing in the lower section a graphic representation of the analysis of a hydrocarbon sample in a chromatograph as described, in which the entire analysis was carried out at ambient temperature and in the upper section a graph of the analysis of the same fraction in which temperature was varied by the means described and illustrated in FIG. 1. In this figure the ordinate is plotted in minutes, the left-hand abscissa in arbitrary recording scale units, and the righthand abscissa in temperature degrees centigrade.

Curve A is developed on the base line B from the analysis of the referred to fraction at a constant temperature of 25° represented by the dotted line C. The hydrocarbon sample analyzed is a commercially available product of the Phillips Petroleum Company identified as Fraction 35. The peaks corresponding to the various hydrocarbons in the fraction are identified on the plot.

Curve D is the record developed on the base line E upon the analysis of the identical material at a temperature schedule represented by the curve F. In the analysis of any record of chromatographic separation the amount of any component present in the sample is proportional to the area under the curve of the peak representing that component, the peak height therefore being a function not only of composition but also of recording speed, flow rate, and temperature.

It is noted that in both curves A and D the propane, isobutane, and normal butane peaks are well defined and are reasonably prompt in appearance. Any increase in temperature above the 25° centigrade ambient would not be desirable since it would accelerate the appearance of these components in the column discharge to the point of confusion of the peaks. However, in curve A it is noted that the pentane of the sample is represented by a very diffuse peak extending from a time of about 12½ minutes through 16 minutes. This not only protracts the analysis, particularly objectionable in monitoring applications or in situations where quick access to the developed data is desired but it makes the integration of the area under the curve difficult and unreliable. In curve D where the temperature of the column was increased rapidly beginning at 5½ minutes the pentane peak is not only relatively well defined but it appears in about 8½ minutes from the initiation of the analysis.

The reproduced records of FIG. 4 show clearly the desirable result of increasing column temperature under certain circumstances, this result having been achieved in part by the rapid temperature rise attainable in the apparatus of the invention. The temperature of the column in the analysis illustrated by curve D was increased from 25° C. at 5½ minutes to 145° C. at 9 minutes, an elapsed time of only 3½ minutes for a 120° C. temperature rise. This rapid temperature rise makes possible the achievement of the optimum temperature profile for any gas analysis.

We claim:

1. In an improved chromatographic analysis system the combination of a chromatographic column constructed of electroconductive material so as to be of low thermal inertia, a source of electric current, current flow control means operable at a selected point during the chromatographic analysis to initiate the flow of electric current from said source at a controlled rate through the column, whereby the temperature of the column rises from an initial analysis temperature in response to said current flow so as to increase the accuracy of the analysis, said current flow control means being operable upon the completion of the analysis to terminate said current flow through the column, and column cooling means for initiating the forced cooling of the chromatographic column upon the completion of the analysis, whereby the temperature of the column is rapidly returned to the initial analysis temperature.

2. In an improved chromatographic analysis system, the combination as described in claim 1 and including programming means cyclically operable to cause to be initiated, in sequential order, the chromatographic analysis, the flow of current through the column and the termination of said current flow, and the forced cooling of the column, whereby consecutive analyses are performed automatically.

3. In a system for chromatographic separation, the combination of a chromatographic column constructed of an electroconductive material so as to be of low thermal inertia and containing a packing for chromatographic separation, means for heating the packing by passing an electrical current through the column whereby the electrical resistance of the column causes the heating thereof, and means for selecting the temperature to which the column is heated by controlling the rate of current flow through the electroconductive material.

4. The combination as described in claim 3 and including a programmer cyclically operable to initially heat the column to a selected temperature to initiate a first portion of a chromatographic separation, said programmer being operable to cause the subsequent heating of the column to increasingly higher temperatures at selected time intervals during the separation and to terminate the current flow in the column upon completion of the separation, and including means, actuated by the programmer, for cooling the column upon the completion of the chromatographic separation, whereby a subsequent separation is initiated by the programmer.

5. In an improved chromatographic analysis system the combination of a chromatographic column constructed of electroconductive material so as to be of low thermal inertia, a source of electric current, current flow control means operable at a selected point during the chromatographic analysis to initiate the flow of electric current from said source at a controlled rate through the column, whereby the temperature of the column rises from an initial analysis temperature in response to said current flow so as to increase the accuracy of the analysis, said current flow control means being operable upon the completion of the analysis to terminate said current flow through the column, and column cooling means for initiating the forced cooling of the chromatographic column upon the completion of the analysis, whereby the temperature of the column is rapidly returned to the initial analysis temperature, the chromatographic column and the column cooling means constituting separate fluid passages disposed about a common axis.

6. In an improved chromatographic analysis system the combination as described in claim 5 and including programming means cyclically operable to cause to be initiated, in sequential order, the chromatographic analysis, the flow of current through the column and the termination of said current flow, and the forced cooling of the column, whereby consecutive analyses are performed automatically.

References Cited in the file of this patent

UNITED STATES PATENTS

| 912,994 | Conrad | Feb. 23, 1909 |
| 2,083,732 | Moore et al. | June 15, 1937 |

FOREIGN PATENTS

| 123,512 | Australia | Feb. 6, 1947 |

OTHER REFERENCES

Gas Chromatography in Plant Stream by Fuller, published in ISA Journal, November 1956, pages 440–444. (Copy in 73–23c).

Book, Vapor Phase Chromatography by Desty, Butterworth's Scientific Publications, London, 1956. (Copy in Patent Office Library, pages 215–219.)

UNITED STATES PATENT OFFICE
CERTIFICATE OF CORRECTION

Patent No. 3,097,517 July 16, 1963

Stuart W. Bowen et al.

It is hereby certified that error appears in the above numbered patent requiring correction and that the said Letters Patent should read as corrected below.

Column 1, line 18, after "column" insert -- in an elutant gas stream flowing through the column. --; line 19, strike out "This order is a function on the relative volatility, molecular"; column 3, lines 22 and 23, for "portoins" read -- portions --.

Signed and sealed this 14th day of January 1964.

(SEAL)
Attest:
ERNEST W. SWIDER

Attesting Officer

EDWIN L. REYNOLDS

Acting Commissioner of Patents